United States Patent
Lan

(10) Patent No.: US 9,380,448 B2
(45) Date of Patent: Jun. 28, 2016

(54) METHODS FOR ACCESSING SUBSCRIBER IDENTITY CARDS VIA A DEDICATED INTERFACE AND SYSTEMS CONTAINING SUBSCRIBER IDENTITY CARDS EACH WITH A DEDICATED INTERFACE

(75) Inventor: Chien-Yu Lan, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 579 days.

(21) Appl. No.: 12/702,427

(22) Filed: Feb. 9, 2010

(65) Prior Publication Data

US 2011/0195749 A1 Aug. 11, 2011

(51) Int. Cl.
- *H04B 1/38* (2015.01)
- *H04W 8/18* (2009.01)
- *H04W 52/02* (2009.01)
- *H04W 88/06* (2009.01)
- *H04W 92/08* (2009.01)

(52) U.S. Cl.
CPC .......... *H04W 8/183* (2013.01); *H04W 52/0216* (2013.01); *H04W 88/06* (2013.01); *H04W 92/08* (2013.01); *Y02B 60/50* (2013.01)

(58) Field of Classification Search
CPC . H04W 52/0216; H04W 88/06; H04W 8/183; H04W 92/08
USPC ............ 455/558, 557, 569.1, 550.1; 340/5.81
See application file for complete search history.

(56) References Cited

U.S. PATENT DOCUMENTS

| | | | |
|---|---|---|---|
| 5,987,325 A | 11/1999 | Tayloe | |
| 6,178,335 B1 | 1/2001 | Vu | |
| 6,557,753 B1 | 5/2003 | Beaujard et al. | |
| 6,889,059 B1 | 5/2005 | Fragola | |
| 2005/0268092 A1* | 12/2005 | Shankar et al. | 713/164 |
| 2006/0270464 A1* | 11/2006 | Daniels et al. | 455/569.1 |
| 2008/0207262 A1 | 8/2008 | Shimizu et al. | |
| 2009/0212908 A1* | 8/2009 | Lin et al. | 340/5.81 |
| 2009/0270130 A1* | 10/2009 | Lee et al. | 455/558 |
| 2010/0011214 A1* | 1/2010 | Cha et al. | 713/175 |
| 2010/0128699 A1* | 5/2010 | Yang et al. | 370/335 |
| 2011/0117962 A1* | 5/2011 | Qiu et al. | 455/558 |
| 2011/0195749 A1 | 8/2011 | Lan | |

FOREIGN PATENT DOCUMENTS

| | | |
|---|---|---|
| CN | 101568194 | 10/2009 |
| CN | 201365349 | 12/2009 |
| CN | 102149175 B | 6/2015 |

OTHER PUBLICATIONS

Office Action dated May 29, 2012, issued in U.S. Appl. No. 12/354,901.
Taiwanese language office action dated May 7, 2013.
English language translation of abstract of CN 201365349 (published Dec. 16, 2009).

* cited by examiner

*Primary Examiner* — Steve D Agosta
(74) *Attorney, Agent, or Firm* — McClure, Qualey & Rodack, LLP

(57) ABSTRACT

A system for accessing subscriber identity cards each via a dedicated interface is provided. The system includes a first subscriber identity card, a second subscriber identity card and a Baseband chip. The Baseband chip includes a first subscriber identity module (SIM) interface coupled to the first subscriber identity card, a second SIM interface coupled to the second subscriber identity card and a processor coupled to the first and second SIM interfaces. The processor accesses the first subscriber identity card via the first SIM interface and the second subscriber identity card via the second SIM interface.

3 Claims, 11 Drawing Sheets

METHODS FOR ACCESSING SUBSCRIBER IDENTITY CARDS VIA A DEDICATED INTERFACE AND SYSTEMS CONTAINING SUBSCRIBER IDENTITY CARDS EACH WITH A DEDICATED INTERFACE

BACKGROUND OF THE INVENTION

1. Field of the Invention

The invention relates to accessing of subscriber identity cards, and more particularly to accessing subscriber identity cards using dedicated controllers.

2. Description of the Related Art

Currently, the Global System for Mobile communication (GSM) standard is a popular standard for mobile phones in the world. The GSM standard, standardized by the European Telecommunication Standards Institute (ETSI) is a cellular network structure and a Time Division Multiple Access (TDMA) system. For a carrier frequency, the TDMA system will divide a frame into eight time slots, wherein each time slot is used to transmit a channel data for a subscriber. Meanwhile, General Packet Radio Service (GPRS) technology is one of the available technologies provided by GSM systems. The GPRS technology utilizes the unused channels in the GSM system to provide moderate speed data transmission. The Wideband Code Division Multiple Access (W-CDMA), is a wideband spread-spectrum mobile air interface that utilizes a direct-sequence spread spectrum method for asynchronous code division multiple access to achieve higher speeds and support more users compared to the implementation of time division multiplexing (TDMA) used by GSM systems. Time Division-Synchronous Code Division Multiple Access (TD-SCDMA) is another type of 3G mobile telecommunications standard.

A dual SIM mobile phone is a phone with two Subscriber Identity Modules (SIMs), which correspond to different telephone numbers. The dual SIM mobile phone allows a user to use two communications services without carrying two phones at the same time. For example, the same mobile phone may be used for business and private use with separate numbers and bills, thus providing convenience to mobile phone users. In the typical architecture, the dual SIMs are connected to an analog switching device, such that a single controller can access the designated SIM by controlling the analog switching device. To access one SIM, however, the controller has to wait for completion of the other if necessary. The sequential arrangement for accessing SIMs consumes more battery power and is required to be reduced.

BRIEF SUMMARY OF THE INVENTION

Methods for accessing subscriber identity cards each via a dedicated interface and systems containing subscriber identity cards each with a dedicated interface are provided. An exemplary embodiment of a system comprises a first subscriber identity card, a second subscriber identity card and a Baseband chip. The Baseband chip comprises: a first subscriber identity module (SIM) interface coupled to the first subscriber identity card; a second SIM interface coupled to the second subscriber identity card; and a processor coupled to the first and second SIM interfaces, accessing the first subscriber identity card via the first SIM interface and the second subscriber identity card via the second SIM interface.

Furthermore, another exemplary embodiment of a system comprises a subscriber identity card and a Baseband chip. The Baseband chip comprises a SIM interface, a first processor coupled to the first SIM interface and a second processor coupled to the first SIM interface. The first processor performs telephony services for the first subscriber identity card. The second processor performs services other than the telephony services governed by an operating system for the subscriber identity card. The SIM interface selectively couples the subscriber identity card to the first or second processor.

Moreover, another exemplary embodiment of a method for aligning polling timers by a mobile station with a first subscriber identity card and a second subscriber identity card, performed by a processor of the mobile station is provided. It is determined whether the second subscriber identity card is operated in an IDLE state when a first timer corresponding to the first subscriber identity card counts to a specific time period. Forthcoming periodic timings are adjusted for polling the first and second subscriber identity cards in parallel when the second subscriber identity card is operated in an IDLE state.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
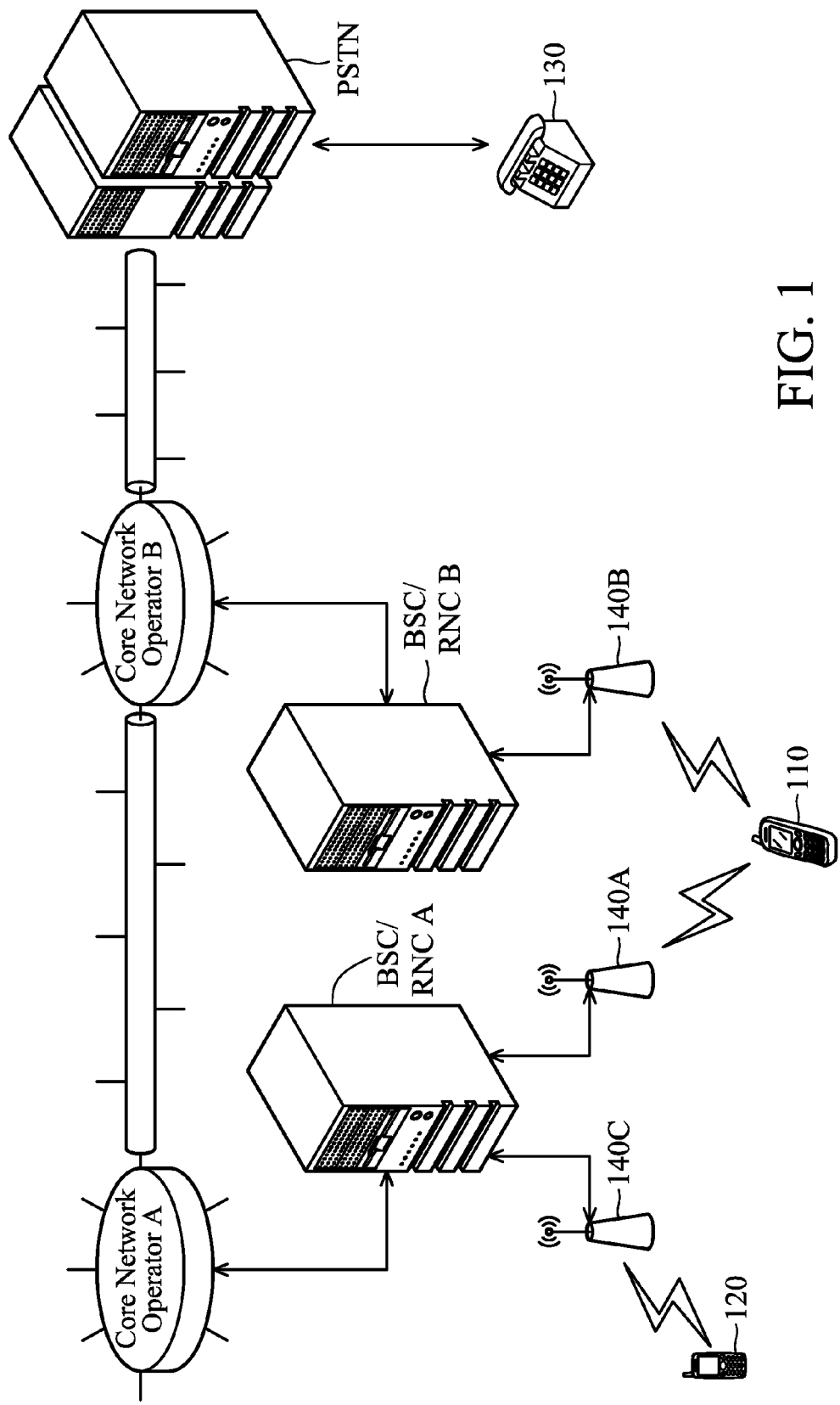
FIG. 1 shows a schematic diagram of a mobile communication network system.

The following description is of the best-contemplated mode of carrying out the invention. This description is made for the purpose of illustrating the general principles of the invention and should not be taken in a limiting sense. The scope of the invention is best determined by reference to the appended claims.

A subscriber identity module (SIM) card typically contains user account information, an international mobile subscriber identity (IMSI) and a set of SIM application toolkit (SAT)

commands and provides storage space for phone book contacts. A micro-processing unit (MCU) of the Baseband chip (simply referred to as a Baseband MCU hereinafter) may interact with MCUs of the SIM cards (each simply referred to as a SIM MCU hereinafter) to fetch data or SAT commands from the plugged in SIM cards. A mobile station (MS) is immediately programmed after plugging in the SIM card. SIM cards may also be programmed to display custom menus for personalized services.

A universal SIM (USIM) card is inserted into a mobile station for a universal mobile telecommunications system (UMTS) or Time Division-Synchronous Code Division Multiple Access (TD-SCDMA) system (also called 3G) telephony communications. The USIM card stores user account information, an IMSI, authentication information and a set of USIM Application Toolkit (USAT) commands and provides storage space for text messages and phone book contacts. A Baseband MCU may interact with an MCU of the USIM card (each simply referred to as a USIM MCU hereinafter) to fetch data or SAT commands from the plugged in USIM cards. The phone book on the USIM card is enhanced when compared to the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS. A mobile station is immediately programmed after plugging in the USIM card.

A removable User Identity Module (R-UIM) or a Code Division Multiple Access (CDMA) Subscriber Identity Module (CSIM) card has been developed for a CDMA mobile station and is equivalent to the GSM SIM and 3G USIM except that it is capable of working in CDMA networks. The R-UIM or the CSIM card is physically compatible with the GSM SIM card, and provides similar security mechanisms for the CDMA system.

The IMSI number is a unique number associated with a global system for a mobile communication (GSM) or a UMTS network user. The IMSI may be sent by a mobile station to a GSM or UMTS network to acquire other details of the mobile user in a Home Location Register (HLR) or as locally copied in the Visitor Location Register (VLR). An IMSI is typically 15 digits long, but may be shorter (for example MTN South Africa's IMSIs are 14 digits). The first 3 digits of the IMSI are the Mobile Country Code (MCC), and they are followed by the Mobile Network Code (MNC), which is either 2 digits (European standard) or 3 digits (North American standard). The remaining digits are the mobile subscriber identification number (MSIN) for a GSM or UMTS network user.

FIG. 1 shows a schematic diagram of a mobile communication network system. In FIG. 1, a mobile station (may be called user equipment interchangeably) 110 with dual subscriber identity cards A and B may simultaneously access two core networks such as, for each, the GSM, WCDMA, CDMA 2000, or TD-SCDMA network, or others after camping on two cells 140A and 140B (i.e. each may be a base station, a node-B or others). The subscriber identity card A or B may be a SIM, USIM, R-UIM or CSIM card. The mobile station 110 may make a voice or data call to a called party 120 or 130 through the GSM system with the Base Station Controller (BSC), WCDMA/CDMA2000/TD-SCDMA network with Radio Network Controller (RNC), Public Switched Telephone Network (PSTN) or any combinations thereof using either of the subscriber identity cards A or B. For example, the mobile station 110 may make a voice call with the subscriber identity card A to the called party 120 through the cell 140A, a BSC/RNC A and a cell 140C in sequence, or make a voice call with the subscriber identity card B to the called party 120 through the cell 140B, a BSC/RNC B, a core network operator B, a core network operator A, the BSC/RNC A and the cell 140C in sequence. Moreover, the mobile station 110 may receive a phone call request with either of the subscriber identity cards A or B from the calling party 120 or 130. For example, the mobile station 110 may receive a phone call request to the subscriber identity card B from the calling party 130 via the PSTN, the core network operator B, the BSC/RNC B and the cell 140B.

Figure 2:
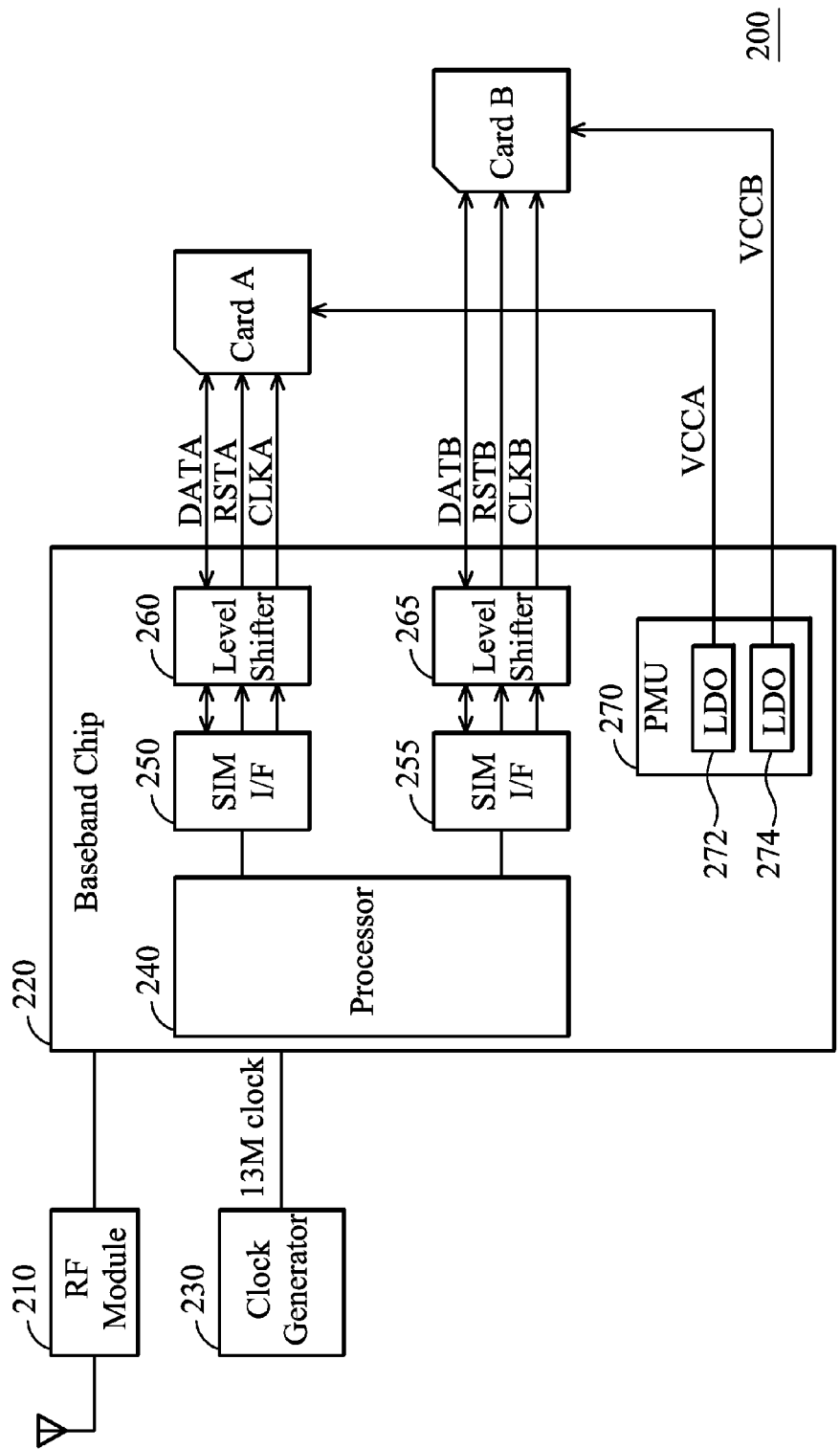
FIG. 2 shows the hardware architecture of a mobile station according to an embodiment of the invention.

FIG. 2 shows the hardware architecture of a mobile station 200 according to an embodiment of the invention. The mobile station 200 comprises a radio frequency (RF) module 210, a Baseband chip 220 and a clock generator 230, wherein two subscriber identity cards A and B may be plugged into two sockets of the mobile station 200 connecting to the Baseband chip 220. Each of the subscriber identity cards A and B may be a SIM, USIM, R-UIM or CSIM card, which is provided by a particular network operator. The mobile station 200 may therefore camp on two cells provided by either the same network operator or different network operators for the plugged in cards A and B and operate in stand-by/idle modes, or even dedicated modes, using the same RF module 210 and the same Baseband chip 220. Furthermore, the Baseband chip 220 comprises a processor 240, two SIM interfaces (I/Fs) 250 and 255, two level shifters 260 and 265, and a power management unit (PMU) 270. The processor 240 controls communications between the subscriber identity card A and the RF module 210 via the SIM I/F 250 and the level shifter 260, and controls communications between the subscriber identity card B and the RF module 210 via the SIM I/F 255 and the level shifter 265. The subscriber identity card A is coupled to the level shifter 260, which may shift the relative signals between the subscriber identity card A and the Baseband chip 220 to suitable voltage levels. Furthermore, the subscriber identity card B is coupled to the level shifter 265, which may shift the relative signals between the subscriber identity card B and the Baseband chip 220 to suitable voltage levels. In this embodiment, the relative signals comprise the data signals (ex. DATA and DATB), reset signals (ex. RSTA and RSTB) and clock signals (ex. CLKA and CLKB). The PMU 270 comprises two regulators 272 and 274. In an embodiment, each of the two regulators 272 and 274 may be a low dropout (LDO) regulator. The regulator 272 provides a voltage VCCA to the subscriber identity card A to serve as an operating voltage of the subscriber identity card A, and the regulator 274 provides a voltage VCCB to the subscriber identity card B to serve as an operating voltage of the subscriber identity card B. In an embodiment, the regulators 272 and 274 may be implemented in a power management integrated chip (PMIC) separate from the Baseband chip 220. For the inserted subscriber identity cards, which may operate with different voltage levels, the mobile station 200 may detect an operating voltage of each inserted subscriber identity card and set an operating voltage level for each level shifter and regulator to initiate the inserted subscriber identity cards after being powered-on.

An RF module (e.g. 210 of FIG. 2) receives wireless radio frequency signals, converts the received signals to baseband signals to be processed by a corresponding Baseband chip (e.g. 220 of FIG. 2), or receives baseband signals from the Baseband chip and converts the received signals to wireless radio frequency signals to be transmitted to a peer device. The RF module may comprise a plurality of hardware devices to perform radio frequency conversion. For example, the RF module may comprise a mixer to multiply the baseband signals with a carrier oscillated in the radio frequency of the wireless communication system, wherein the radio frequency may be, for example, 900 MHz or 1800 MHz or 2100 MHz for a global system for GSM, or 1900 MHz or 2100 MHz for UMTS or TD-SCDMA system. The Baseband chip further converts the baseband signals to a plurality of digital signals, and processes the digital signals, and vice versa. The Baseband chip may also comprise a plurality of hardware devices to perform baseband signal processing. The baseband signal processing may comprise analog to digital conversion (ADC), digital to analog conversion (DAC), gain adjustments, modulation/demodulation, encoding/decoding, and so on.

A SIM application toolkit (SAT) is a standard of the GSM which enables an SIM MCU to initiate actions which can be used for various value added services. The SAT consists of a set of commands programmed into an SIM card which define how the SIM MCU interacts directly with the outside world and initiates commands independently of the mobile station and the network. The SAT enables the SIM MCU to build up an interactive exchange between a network application and an end user and access or control access to the network. The SIM MCU also provides SAT commands to the Baseband MCU to display a menu, ask for user input, or the similar. A SAT has been deployed by many network operators for many applications, often where a menu-based approach is required, such as Mobile Banking and content browsing. Designed as a single application environment, SAT can be started at the initial power up of the SIM card and is especially suited to low level applications with simple user interfaces.

A USIM Application Toolkit (USAT) is the equivalent of an SAT for 3G networks. A USAT enables the USIM MCU to initiate actions which can be used for various value added services delivered over the mobile station. The USAT is employed in a multi-application environment of 3G devices and is not activated until a specific application has been selected, unlike SAT, which is activated at startup. Certain functions are card related rather than application related.

To ensure that any of the inserted subscriber identity cards has not been removed during a call session, a processor of a Baseband chip (e.g. 220 of FIG. 2) sends, at regular intervals, a STATUS command during each call. A STATUS command may be issued during all predetermined inactive time periods (e.g. 30 second periods) to the Baseband interface during a call. Inactivity may be defined as the period starting from the end of the last communication or the last issued STATUS command. If no response data is received following issuance of the STATUS command, then the call is terminated as soon as possible, within a predetermined time period (e.g. 5 seconds), after the STATUS command has been sent. If a dedicated file (DF) is received following issuance of the STATUS command, and the indicated DF is not the same as that which was indicated in a previous response, or accessed by a previous command, then the call is terminated as soon as possible, within a predetermined time period (e.g. 5 seconds), after the response data has been received. The mentioned polling procedure is used to detect the removal of a subscriber identity card.

Figure 3:
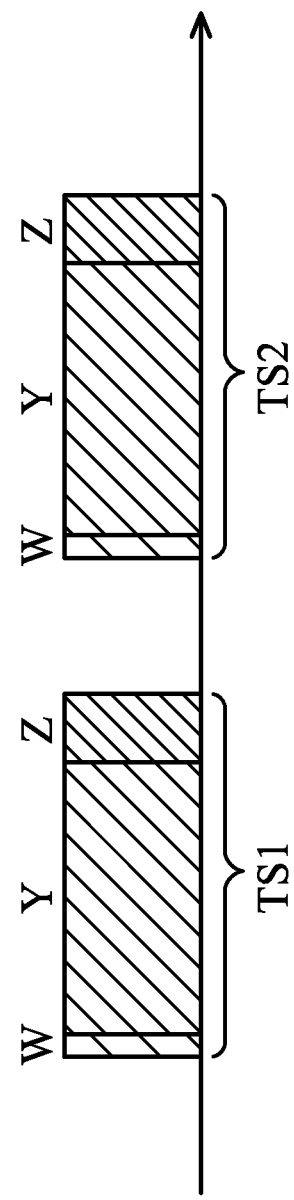
FIG. 3 shows a schematic diagram illustrating two sequences of time slots for issuing STATUS commands to subscriber identity cards A and B.

FIG. 3 shows a schematic diagram illustrating two sequences of time slots for issuing STATUS commands to the subscriber identity cards A and B when the STATUS commands are not aligned. The sequences are employed in a typical architecture, in which two SIM cards connect to a single analog switching device, for performing the polling procedures respectively. A processor performs a proactive polling procedure by issuing a STATUS command to the subscriber identity card A during the time period TS1 and issuing a STATUS command to the subscriber identity card B during the time period TS2. During each time interval W, a Baseband chip directs a clock generator to generate the clock signals with a frequency of a multiple of 13 MHz, and accordingly directs a single SIM I/F by controlling the analog switching device to provide the clock signal CLKA to the subscriber identity card A during the time period TS1, and subsequently, turning the analog switching device to direct the SIM I/F to provide the clock signal CLKB to the subscriber identity card B during the time period TS2. The Baseband chip issues a STATUS command to the subscriber identity card A during the time interval Y of the time period TS1, and issues a STATUS command to the subscriber identity card B during the time interval Y of the time period TS2. At the end of each time interval Y, a time interval Z is counted by a timer, which is configurable to a specific time between 10~20 ms. After receiving a signal indicating that the time interval Z has been reached (i.e. about the end of each time interval Z), the Baseband chip disables the clock signals provided to the subscriber identity card A or B by controlling the analog switching device. The time intervals W, Y and Z may require 1 ms, 8~25 ms and 10~20 ms, respectively. Note that the length of the time interval Z has to be set to guarantee that requisite operations for the subscriber identity card A or B can be successfully completed before the end of the time interval Z. It is to be understood that the clock generator has to be activated for two time periods TS1 and TS2.

In order to reduce power consumption described with reference to FIG. 3, the hardware architecture of FIG. 2 may be applied. Moreover, two timers (may be implemented by hardware or software) are provided to activate proactive polling procedures for the subscriber identity cards A and B, respectively. Assuming that a timer A corresponding to the subscriber identity card A is a master timer while a timer B corresponding to the subscriber identity card B is a slave timer, when completing a communication process between the Baseband chip (e.g. 220 of FIG. 2) and the subscriber identity card A or an issuance process of a STATUS command issued to the subscriber identity card A, the timer A is reset and starts a re-count process. Similarly, the timer B is reset and starts to re-count when completing a communication process between the Baseband chip (e.g. 220 of FIG. 2) and the subscriber identity card B or an issuance process of a STATUS command to the subscriber identity card B. The processor of the Baseband chip (e.g. 220 of FIG. 2) receives a signal from the timer A or B when the timer A or B counts to a particular time period, such as about 30 seconds, from the moment of the last reset of the timer A or B.

Figure 4:
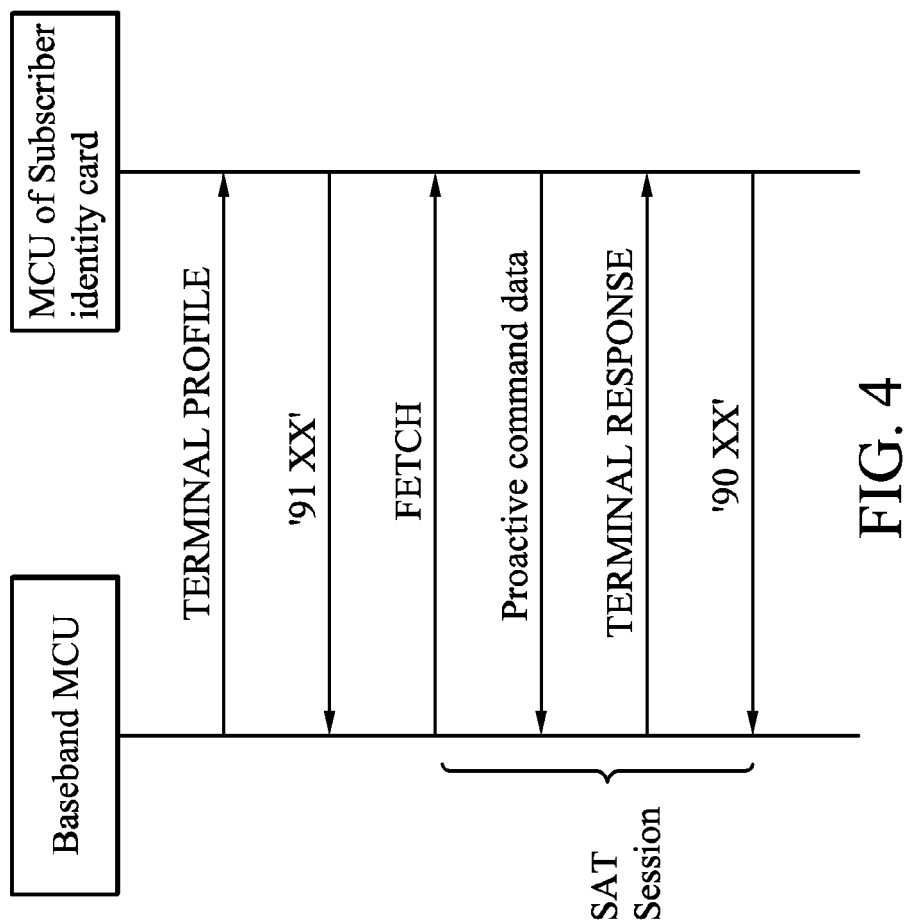
FIG. 4 shows a diagram illustrating an operation of a proactive command between a Baseband MCU and a subscriber identity card MCU.

FIG. 4 shows a diagram illustrating exemplary communications processes between the Baseband MCU (e.g. the processor 240 of FIG. 2) and the subscriber identity card MCU. The Baseband MCU operates as a master MCU and initiates commands to the MCU of the subscriber identity card. Note that the communications procedures may end in '90 00' (indicating normal ending to the initiated command), or may end in '91 XX' (indicating response data available from a subscriber identity card). The response code '91 XX' may also inform the Baseband MCU that the previous command has been successfully executed by the MCU of the subscriber identity card in the same way as '90 00' (i.e. "OK"), as well as, indicate response data which contains an SAT/USAT proactive command from the MCU of the subscriber identity card for a particular procedure. The value 'XX' indicates the length of the response data. Following, the Baseband MCU uses the FETCH command to obtain the response data indicating a particular SAT/USAT proactive command. If the indicated command has been successfully executed, the Baseband MCU informs the MCU of the subscriber identity card of "TERMINAL RESPONSE". If the indicated command is not successfully executed, the Baseband MCU informs the MCU of the subscriber identity card of "TERMINAL RESPONSE" with an error condition.

Figure 5:
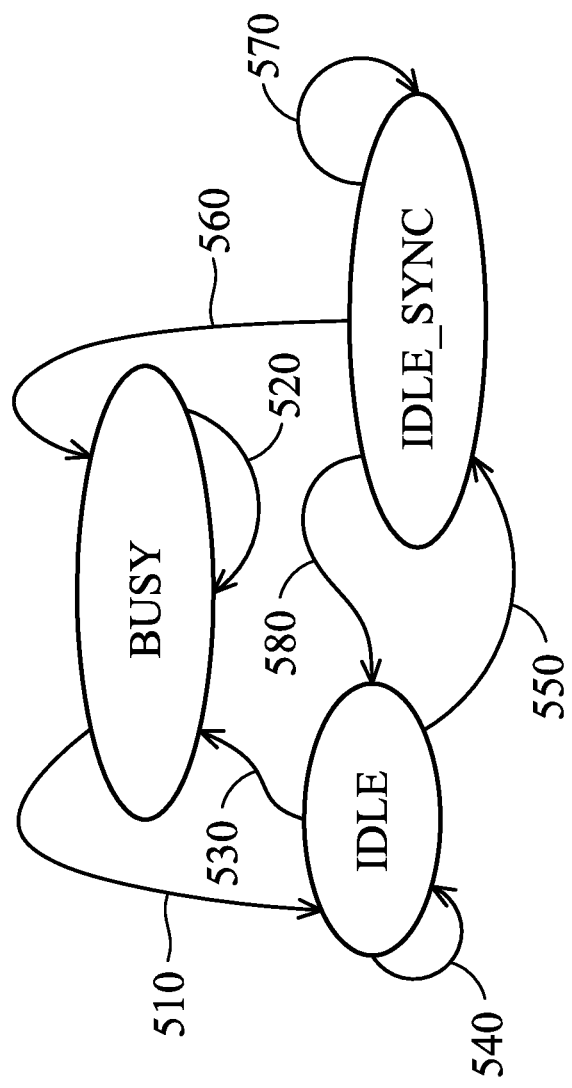
FIG. 5 shows a 3-states machine for the subscriber identity card B of FIG. 2.

In order to aligning the polling to subscriber identity cards A and B, a software module A corresponding to the subscriber identity card A operates as a master to coordinately start and/or cancel synchronization of the polling. When executing the software module B corresponding to the subscriber identity card B, the Baseband MCU (e.g. the processor 240 of FIG. 2) maintains 3-states, as shown in FIG. 5, composed of BUSY, IDLE, and IDLE-SYNC states. In the BUSY state, when receiving a signal from the timer B indicating that a specific time period (e.g. 30 seconds) has been reached, the BUSY state is changed to the IDLE state (as shown in arrow 510), and then the timer B is reset to re-count and a STATUS command is issued to the subscriber identity card B, so as to poll the subscriber identity card B. Moreover, when completing a communication process between the Baseband chip and the subscriber identity card B, the BUSY state is held (as shown in arrow 520) and the timer B is reset to re-count. In the IDLE state, when completing a communication process between the Baseband chip and the subscriber identity card B (e.g. an SAT/USAT command session), the IDLE state is changed to the BUSY state (as shown in arrow 530), and the timer B is reset to re-count. Furthermore, when receiving a signal from the timer B indicating that the specific time period has been reached, the IDLE state is held (as shown in arrow 540), and then the timer B is reset to re-count and a STATUS command is issued to the subscriber identity card B. Moreover, when receiving a signal indicating that polling to subscriber identity cards A and B is required to be synchronized (i.e. the timers A and B are required to be synchronized), the IDLE state is changed to the IDLE-SYNC state (as shown in arrow 550), the timer B is reset to re-count and a STATUS command is issued to the subscriber identity card B. The signal indicating that polling to subscriber identity cards A and B is required to be synchronized is typically issued by the software module A corresponding to the subscriber identity card A when executing. In the IDLE_SYNC state, when completing a communication process between the Baseband chip and the subscriber identity card B (e.g. an SAT/USAT command session), the IDLE_SYNC state is changed to the BUSY state (as shown in arrow 560) and the timer B is reset to re-count. Moreover, when receiving a signal from the timer B indicating that the specific time period has been reached, the IDLE_SYNC state is held (as shown in arrow 570), and then the timer B is reset to re-count and a STATUS command is issued to the subscriber identity card B. Moreover, when receiving a signal indicating that polling to subscriber identity cards A and B has not been synchronized (i.e. timers A and B have not been synchronized), the IDLE_SYNC state is changed to the IDLE state (as shown in arrow 580). The signal indicating that polling to subscriber identity cards A and B has not been synchronized is typically issued by the software module A corresponding to the subscriber identity card A when executing.

Figure 6:
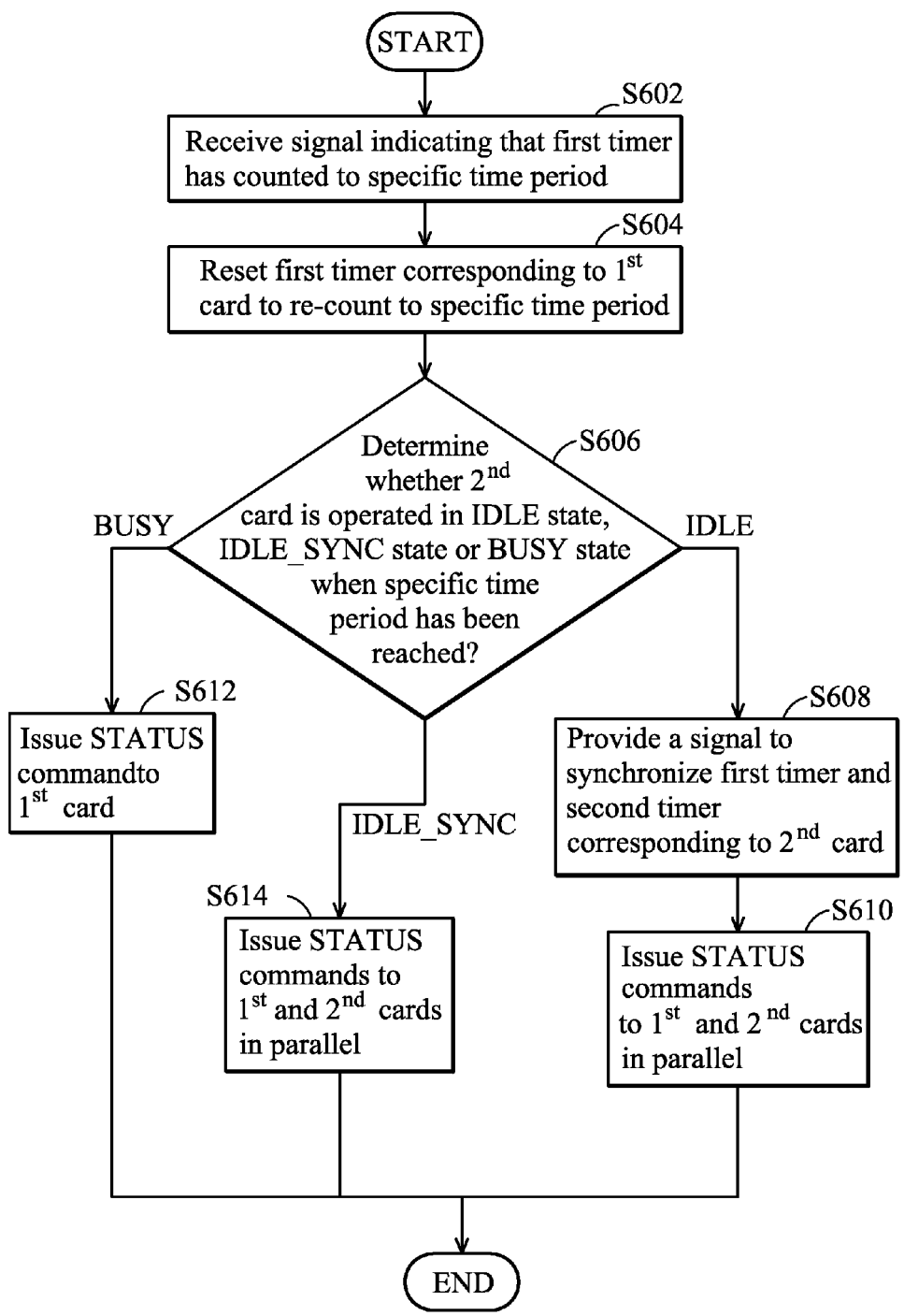
FIG. 6 shows a flow chart illustrating a method for aligning polling timers by a mobile station with a first subscriber identity card and a second subscriber identity card according to an embodiment of the invention.

FIG. 6 shows a flow chart illustrating a method for aligning polling timers by a mobile station with a first subscriber identity card (e.g. card A of FIG. 2) and a second subscriber identity card (e.g. card B of FIG. 2), being performed when executing software/firmware code by a processor of the mobile station (e.g. 240 of FIG. 2), according to an embodiment of the invention. First, in step S602, the first subscriber identity card is operated in an IDLE state and a signal indicating that a first timer corresponding to the first subscriber identity card has counted to a specific time period, also called a polling time period (e.g. 30 seconds), is received. Next, in step S604, the first timer corresponding to the first subscriber identity card is reset to re-count to the specific time period. Next, it is determined whether the second subscriber identity card is operated in an IDLE state, IDLE_SYNC state or BUSY state (step S606). The second subscriber identity card being operated in an IDLE state indicates that the second subscriber identity card will be periodically polled independent from polling to the first subscriber identity card, such that the polling timings to the first and second subscriber identity cards are substantially inconsistent. The second subscriber identity card being operated in a BUSY state indicates that the time elapsed after the prior communications session with the processor is shorter than the specific time period. The second subscriber identity card being operated in an IDLE_SYNC state indicates that the timings to poll the second subscriber identity card is substantially the same as that to poll the first subscriber identity card, i.e. the first and second subscriber identity cards can be polled in parallel substantially to save battery power consumption. Polling to first and second subscriber identity cards does not mean that the STATUS commands are simultaneously issued to both cards. Instead, it means that the processor serially issues the STATUS commands to the first and second subscriber identity cards, where the issuance time difference is as short as possible to save more battery power. If the STATUS commands cannot be closely issued in turn, the processor has to issue the later one before the in-process issuance finishes. If the second subscriber identity card is operated in an IDLE state, a signal is provided to synchronize polling to the first and second subscriber identity cards (i.e. reset both the first timer and a second timer corresponding to the second subscriber identity card, at the almost same time, to recount to the specific time period) (step S608) and then to force the second subscriber identity card to enter an IDLE_SYNC state. After that, the pollings to the first and second subscriber identity cards will be performed in parallel. Next, the STATUS commands are issued to poll the first and second subscriber identity cards in parallel (step S610). If the second subscriber identity card is operated in a BUSY state, a STATUS command is issued to poll the first subscriber identity card (step S612). If the second subscriber identity card is operated in an IDLE_SYNC state, the STATUS commands are issued to poll the first and second subscriber identity cards in parallel (step S614).

Figure 7:
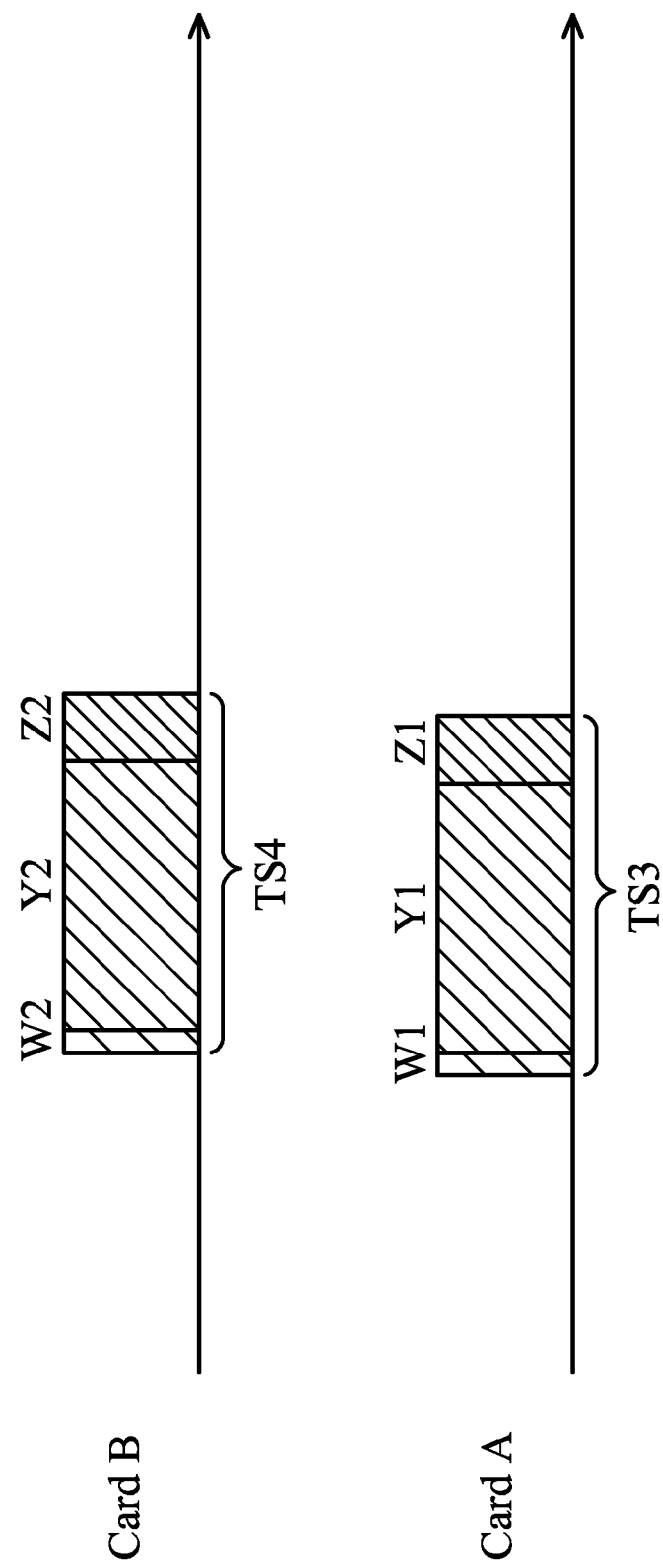
FIG. 7 shows a schematic diagram illustrating a sequence of time slots for issuing STATUS commands to subscriber identity cards A and B when performing embodiments of methods for aligning polling timers.

FIG. 7 shows a schematic diagram illustrating an exemplary sequence of time slots for issuing STATUS commands to the subscriber identity cards A and B when performing embodiments of methods for aligning polling timers. It is to be understood that, when two tasks for polling the subscriber identity cards A and B are performed in parallel through SIM interfaces 250 and 255 respectively, two time slots are partially overlapped. Comparing with FIG. 3, less batter power consumption can be achieved because the time periods TS3 and TS4 for issuing STATUS commands to the subscriber identity cards A and B are overlapped. Specifically, referring to FIG. 2, during the time interval W1, the Baseband chip 220 directs the clock generator 230 to generate the clock signals with a frequency of a multiple of 13 MHz, and directs the SIM I/F 250 to provide the clock signal CLKA to the subscriber identity card A. Next, the Baseband chip 220 issues a STATUS command to the subscriber identity card A for the time interval Y1, and in turn, directs the SIM I/F 255 to provide the clock signal CLKB to the subscriber identity card B for the time interval W2. After W1, the Baseband chip 220 issues a STATUS command to the subscriber identity card B for the time interval Y2. At the end of the time interval Z2, the Baseband chip 220 disables the clock generator 230. Therefore, the operating time of the clock generator 230 may be substantially reduced to the time period for polling to a single subscriber identity card, leading to less battery power consumption.

Figure 8:
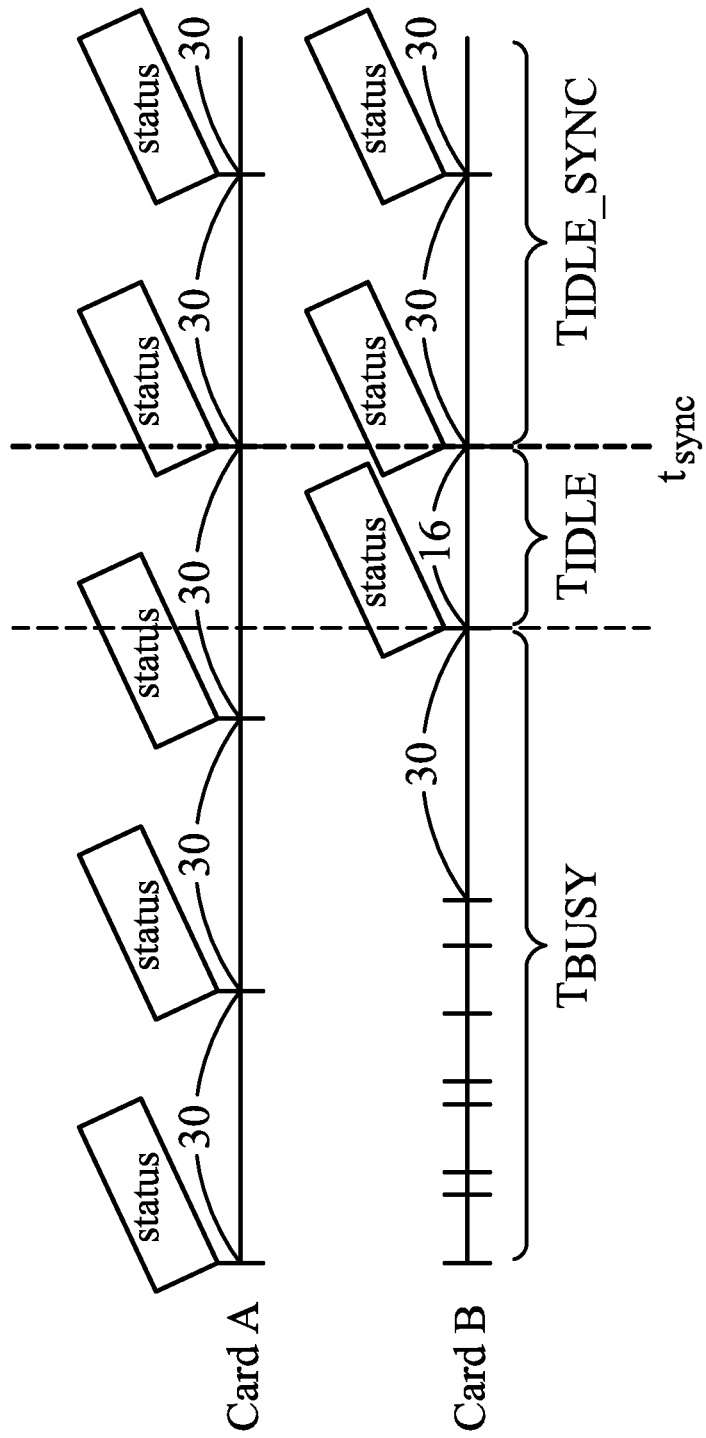
FIG. 8 shows a schematic diagram illustrating the issuance of STATUS commands being aligned by using the described embodiments of methods for aligning polling timers of the invention.

As a result, referring to FIG. 8, it is shown that the issuance of STATUS commands is aligned by using the described embodiments of methods to reduce power consumption. The Baseband MCU may issue a STATUS command to the subscriber identity card A every 30 seconds as counted by the timer A. Assume that the subscriber identity card B operates in the BUSY state during a time period $T_{BUSY}$, the IDLE state during a time period $T_{IDLE}$ and the IDLE_SYNC state during a time period $T_{IDLE\_SYNC}$. At time $t_{sync}$, a 30 second period counted by the timer A is reached. After that, the Baseband MCU may receive a signal indicating that polling to subscriber identity cards A and B is required to be synchronized. Thus, the Baseband MCU may issue STATUS commands to the subscriber identity card A and B in parallel as shown in FIG. 7.

Broadcast mobile television (TV) refers to the provision of video programming to cell phones through broadcast networks, which generally requires adding a TV receiver module into cell phones. China Multimedia Mobile Broadcasting (CMMB) is a mobile television and multimedia standard based on the satellite and terrestrial interactive multiservice infrastructure (STiMi). It specifies usage of the 2.6 GHz frequency band and occupies 25 MHz bandwidth within which it provides 25 video and 30 radio channels with additional data channels. Furthermore, CMMB uses the Orthogonal Frequency Division Multiplexing (OFDM) technique to achieve low cost equalizer implementation, large frequency diversity gain, and high spectrum efficiency.

Figure 9:
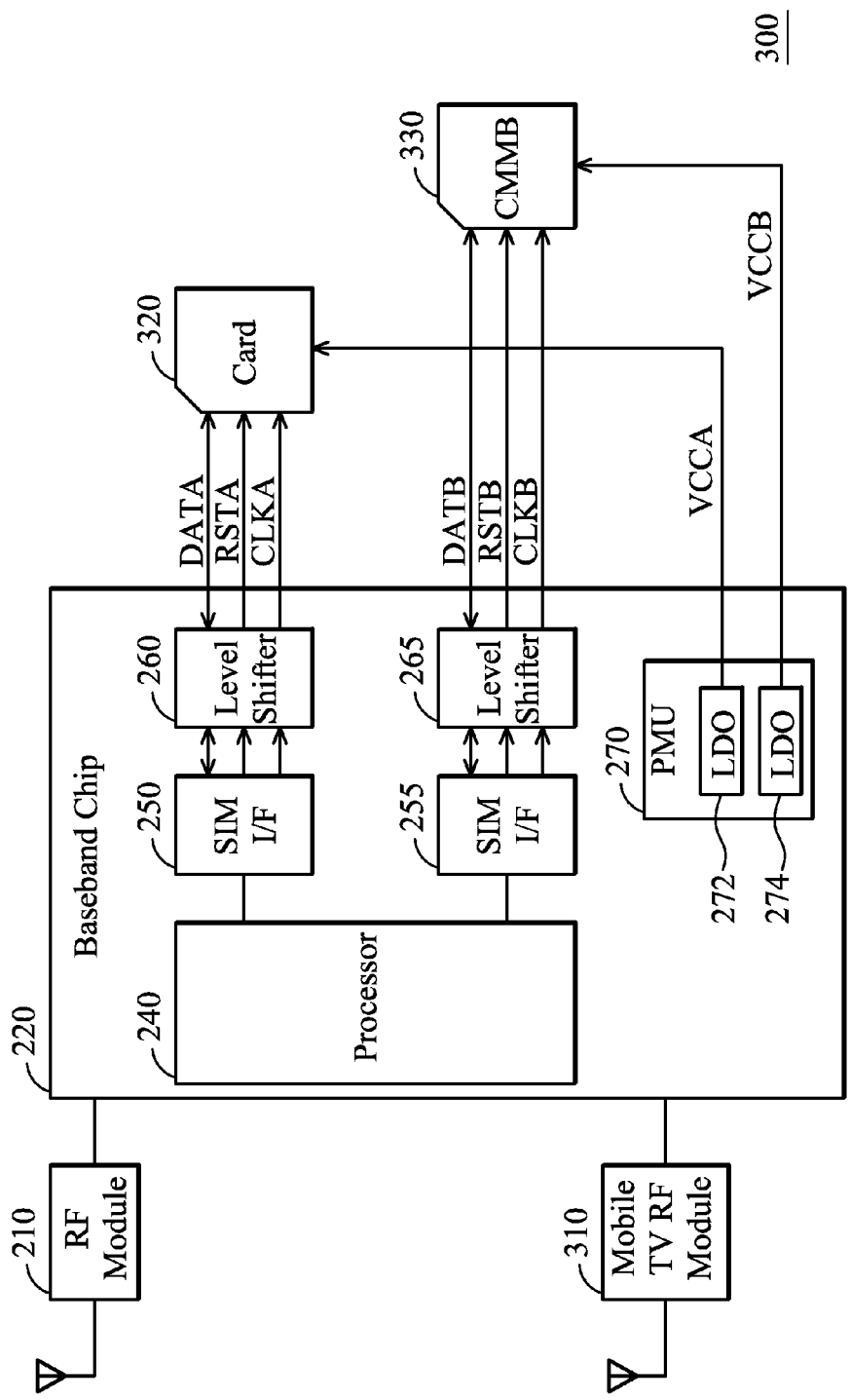
FIG. 9 shows the hardware architecture of a mobile station according to another embodiment of the invention.

FIG. 9 shows the hardware architecture of a mobile station 300 according to another embodiment of the invention. Compared with the mobile station 200 of FIG. 2, the mobile station 300 further comprises a mobile TV RF module 310. In addition, two subscriber identity cards 320 and 330 are plugged into two sockets of the mobile station 300 connecting to the Baseband chip 220. The subscriber identity card 320 may be a SIM, USIM, R-UIM or CSIM card, and the subscriber identity card 330 may be a CMMB card. In the mobile station 300, the processor 240 controls communication between the subscriber identity card 320 and the RF module 210 via the SIM I/F 250 and the level shifter 260 and the communications between the subscriber identity card 330 and the mobile TV RF module 310 via the SIM I/F 255 and the level shifter 265 in parallel. The subscriber identity card 330 stores at least one key, where the key is periodically utilized to decrypt the broadcasted TV program content. For the subscriber identity cards 320 and 330 are accessed via independent interfaces, the communications with one card does not interfere with that with the other. For example, during the TV program content reception with interaction with the subscriber identity card 330, the processor 240 is capable of periodically polling the subscriber identity card 320 or communicating with the subscriber identity card 320 via SAT/USAT proactive commands.

Figure 10:
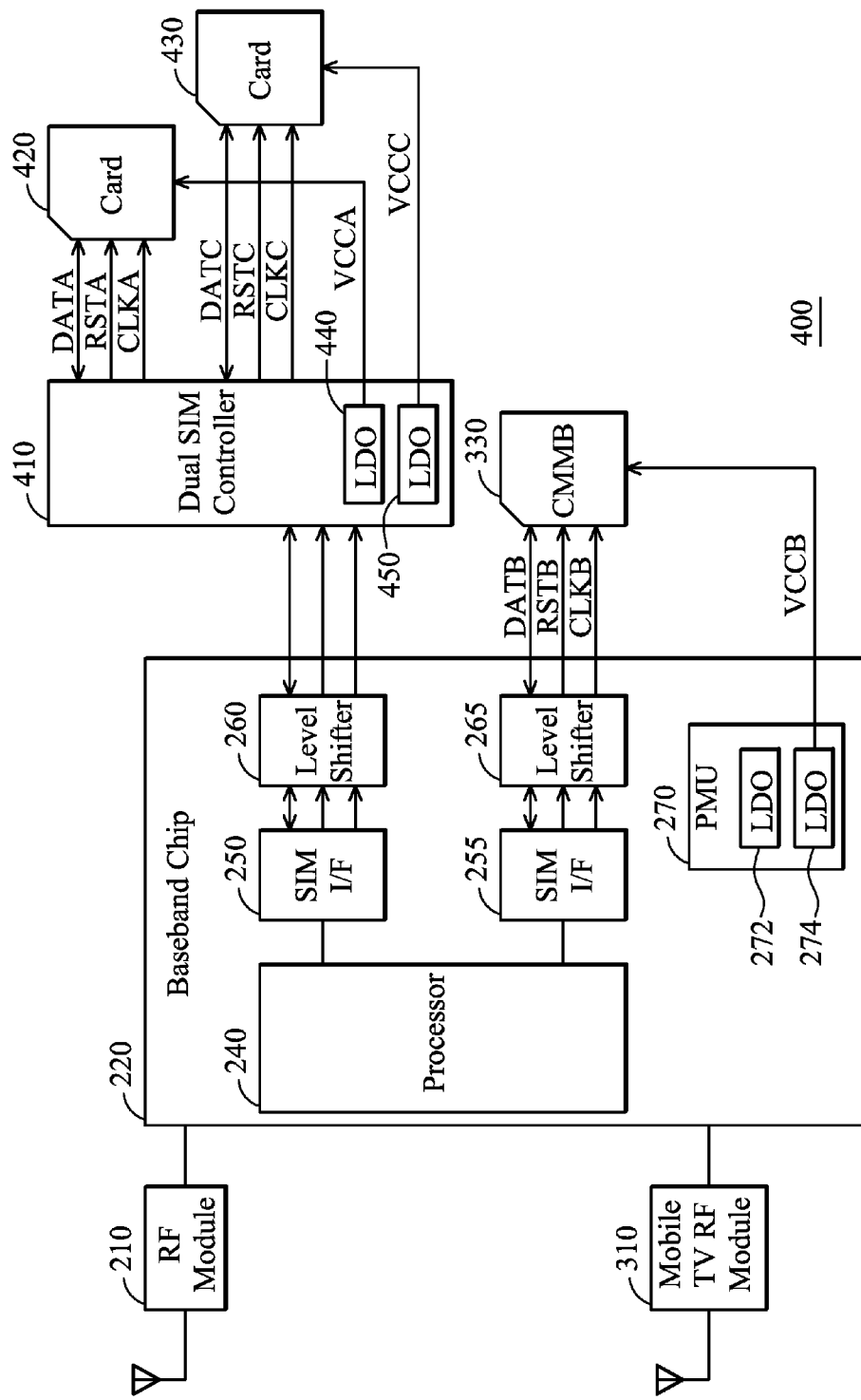
FIG. 10 shows the hardware architecture of a mobile station according to another embodiment of the invention.

FIG. 10 shows the hardware architecture of a mobile station 400 according to another embodiment of the invention. Compared with the mobile station 300 of FIG. 9, the mobile station 400 further comprises a dual SIM controller 410 coupled between the Baseband chip 220 and two subscriber identity cards 420 and 430. Each of the subscriber identity cards 420 and 430 may be a SIM, USIM, R-UIM or CSIM card, which is provided by a particular network operator. The Baseband chip 220 reads data from one of the subscriber identity cards 420 and 430 and writes data to one of the subscriber identity cards 420 and 430 via the dual SIM controller 410. The dual SIM controller 410 comprises two regulators 440 and 450. In an embodiment, each of the two regulators 440 and 450 may be an LDO regulator. Furthermore, the regulator 440 provides a voltage VCCA to the subscriber identity card A to serve as an operating voltage of the subscriber identity card 420, and the regulator 450 provides a voltage VCCC to the subscriber identity card 430 to serve as an operating voltage of the subscriber identity card 430. In an embodiment, the operating voltages of the subscriber identity cards 420 and 430 are provided by the PMU 270 of the Baseband chip 220. When receiving a signal from the Baseband chip 220 indicating that the subscriber identity card 420 or the subscriber identity card 430 has been selected, the dual SIM controller 410 couples the selected subscriber identity card to the Baseband chip 220 for enabling communications (such as relative signal transceiving) between the selected subscriber identity card and the Baseband chip 220. In this embodiment, the relative signals comprise the data signals (ex. DATA and DATC), reset signals (ex. RSTA and RSTC) and clock signals (ex. CLKA and CLKC).

Figure 11:
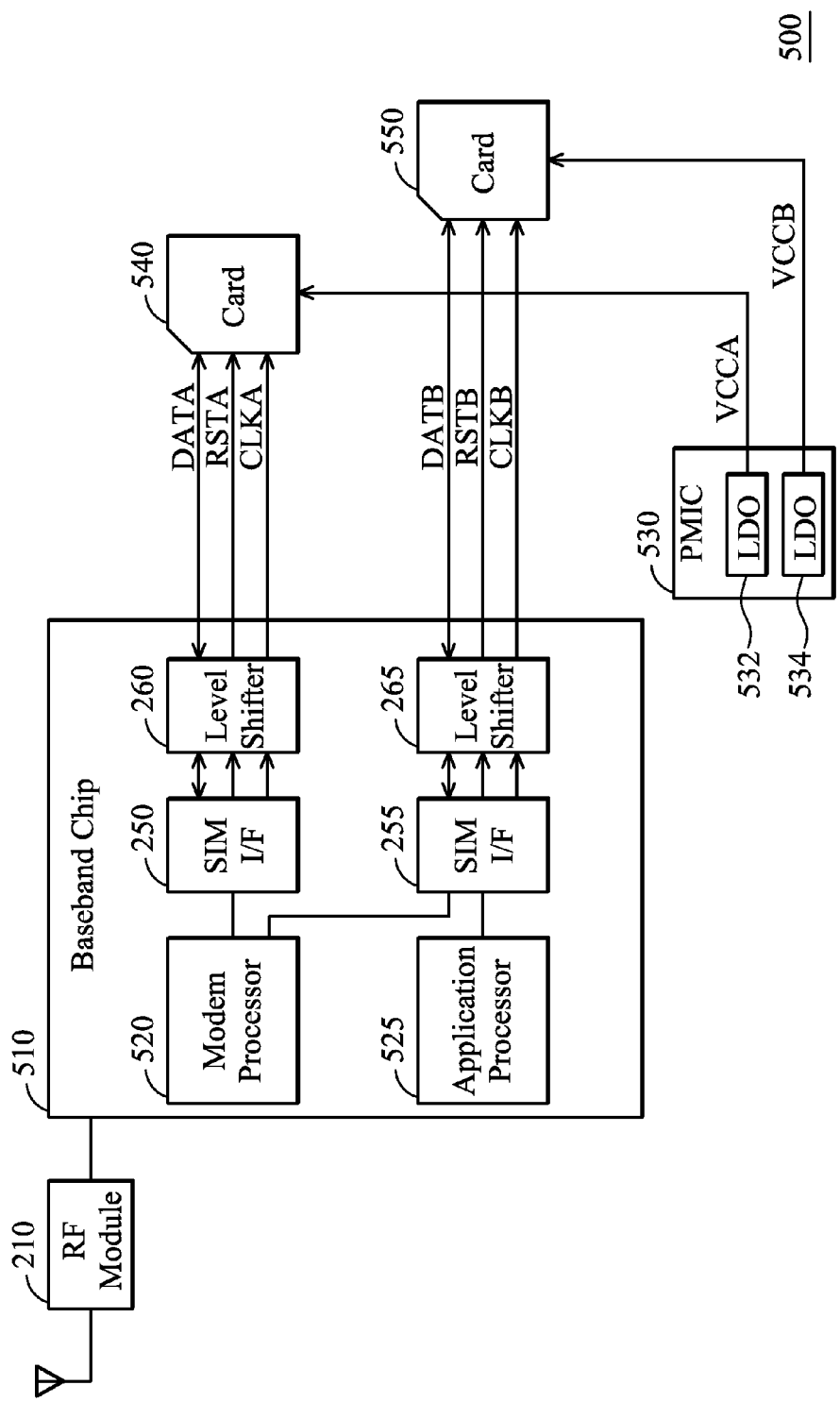
FIG. 11 shows the hardware architecture of a mobile station according to another embodiment of the invention.

FIG. 11 shows the hardware architecture of a mobile station 500 according to another embodiment of the invention. The mobile station 500 comprises a Baseband chip 510 for controlling the communications between one subscriber identity card 540 or 550 and the RF module 210, and a PMIC 530 for providing the operating voltages VCCA and VCCB to the subscriber identity cards 540 and 550 via the regulators 532 and 534, respectively. In an embodiment, the regulators 532 and 534 may be implemented in the Baseband chip 510. The Baseband chip 510 comprises a modem processor 520, an application processor 525, two SIM interfaces (I/Fs) 250 and 255 and two level shifters 260 and 265. The modem processor 520 is coupled to the SIM I/Fs 250 and 255, and is used to perform phone applications for the subscriber identity cards 540 and 550. The application processor 525 is coupled to the SIM I/F 255, and the application processor 525 is used to perform a variety of applications governed by an operating system (OS) for the subscriber identity card 550. The OS may be Window Mobile introduced by Microsoft®, Android introduced by Google®, or others. The subscriber identity card 540 may be a SIM, USIM, R-UIM or CSIM card, and store an IMSI for authentication when various telephony services are attempted to be used. The subscriber identity card 550 may also be a SIM, USIM, R-UIM or CSIM card, and the modem processor 520 may poll the subscriber identity cards 540 and 550 via the SIM I/Fs 250 and 255 in parallel, and reference can be made to FIGS. 6 to 8. In some embodiments, the subscriber identity card 550 may be a CMMB card, a smart card for electronic finance/business authentication or a Worldwide Interoperability for Microwave Access (WiMAX) card. The CMMB card stores at least one key used in decryption of broadcasted TV programs. The smart card stores authentication data, typically used to identify the owner, to enable transactions of purchasing goods and services, entering restricted areas, accessing medical, financial, or other records, and so on. The subscriber identity card 550 may be a combo card being operated as at least two of SIM, USIM, R-UIM, CSIM, CMMB, smart and WiMAX cards. The modem processor 520 communicates with the subscriber identity card 540 and 550 via the SIM I/F 250 and 255 respectively, such that the interaction with one subscriber identity card does not interfere with the other. When the subscriber identity card 550 is a CMMB card compatible with the CMMB standard, the application processor 525 may play the TV program data from the RF module 210 with the key stored therein. When the subscriber identity card 550 is a smart card operating like a credit card or an automated teller machine (ATM) card, the application processor 525 may encrypt/decrypt the data transmitted between the mobile station 500 and the bank terminals with the stored keys, such as a personal identification number (PIN), certificate authentication (CA), and so on. In this embodiment, the modem processor 520 is configured to access subscriber identity cards 540 and 550 via different SIM interfaces 250 and 255 for various telephony services, such as basic services, short message services (SMS), multimedia message services (MMS), supplementary services (SS), and so on, while the application processor 525 is configured to access only subscriber identity card 550 via SIM interface 255 for other services, such as mobile TV receiving, credit card, ATM, door entrance, and banking services, and so on.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A system, comprising:
a baseband chip, comprising:
a first SIM interface coupled only to a first subscriber identity card;
a second SIM interface coupled only to a second subscriber identity card;
a first processor directly coupled to the first SIM interface and the second SIM interface, performing telephony services for the first subscriber identity card and the second subscriber identity card;
a second processor directly coupled to the first SIM interface, performing services other than the telephony services governed by an operating system for the first subscriber identity card;
the second SIM interface coupled between the second subscriber identity card and the first processor of the baseband chip;
a first level shifter coupled to the first SIM interface;
a second level shifter coupled to the second SIM interface,
wherein the first processor of the baseband chip polls the first subscriber identity card via the first SIM interface and the second subscriber identity card via the second SIM interface in parallel,
wherein the baseband chip sets the first level shifter to a voltage level of a first operating voltage for the first subscriber identity card, and sets the second level shifter to a voltage level of a second operating voltage for the second subscriber identity card,
wherein the polling of the first subscriber card and the second subscriber card are performed independently, if the second subscriber card is operated in an IDLE state, a signal is provided to force the second subscriber card to synchronize the polling to the second subscriber identity card with the polling to the first subscriber identity card, and
an RF module,
wherein the baseband chip cooperates with the first subscriber identity card to camp on a first cell and cooperates with the second subscriber identity card to camp on a second cell via the RF module.

2. The system as claimed in claim 1, further comprises:
a first regulator coupled to the first subscriber identity card, providing a first operating voltage to the first subscriber identity card to serve as an operating voltage of the first subscriber identity card; and
a second regulator coupled to the second subscriber identity card, providing a second operating voltage to the second subscriber identity card to serve as an operating voltage of the second subscriber identity card.

3. A system, comprising:
a baseband chip, comprising:
a first SIM interface coupled to only a first subscriber identity card;
a second SIM interface coupled to only a second subscriber identity card;
a first processor directly coupled to the first SIM interface and the second SIM interface, performing telephony services for the first subscriber identity card and the second subscriber identity card;
a second processor directly coupled to the first SIM interface, performing services other than the telephony services governed by an operating system for the first subscriber identity card;
a first regulator coupled to the first subscriber identity card, providing a first operating voltage to the first subscriber identity card to serve as an operating voltage of the first subscriber identity card; and
a second regulator coupled to the second subscriber identity card, providing a second operating voltage to the second subscriber identity card to serve as an operating voltage of the second subscriber identity card,
an RF module,
wherein the Baseband chip cooperates with the first subscriber identity card to camp on a first cell and cooperates with the second subscriber identity card to camp on a second cell via the RF module;
wherein the Baseband chip further comprises:
the second SIM interface coupled between the second subscriber identity card and the first processor of the Baseband chip,
wherein the first processor of the Baseband chip polls the first subscriber identity card via the first SIM interface and the second subscriber identity card via the second SIM interface in parallel;
wherein the polling of the first subscriber card and the second subscriber card are performed independently, if the second subscriber card is operated in an IDLE state, a signal is provided to force the second subscriber card to synchronize the polling to the second subscriber identity card with the polling to the first subscriber identity card,
wherein the first regulator and the second regulator are implemented in a power management integrated circuit or the baseband chip.

* * * * *